US011409011B2

United States Patent
Hu

(10) Patent No.: US 11,409,011 B2
(45) Date of Patent: Aug. 9, 2022

(54) METHODS AND SYSTEMS FOR OBTAINING RECONSTRUCTED LOW-FREQUENCY SEISMIC DATA FOR DETERMINING A SUBSURFACE FEATURE

(71) Applicant: Advanced Geophysical Technology Inc., Houston, TX (US)

(72) Inventor: Wenyi Hu, Houston, TX (US)

(73) Assignee: Advanced Geophysical Technology Inc., Houston, TX (US)

( * ) Notice: Subject to any disclaimer, the term of this patent is extended or adjusted under 35 U.S.C. 154(b) by 285 days.

(21) Appl. No.: 16/923,525

(22) Filed: Jul. 8, 2020

(65) Prior Publication Data

US 2021/0063591 A1    Mar. 4, 2021

Related U.S. Application Data

(60) Provisional application No. 62/893,462, filed on Aug. 29, 2019.

(51) Int. Cl.
*G01V 1/28* (2006.01)
*G01V 1/30* (2006.01)

(52) U.S. Cl.
CPC .............. *G01V 1/282* (2013.01); *G01V 1/303* (2013.01); *G01V 2210/673* (2013.01)

(58) Field of Classification Search
CPC ... G01V 1/282; G01V 1/303; G01V 2210/673
See application file for complete search history.

(56) References Cited

U.S. PATENT DOCUMENTS

| | | | | |
|---|---|---|---|---|
| 2019/0169962 A1* | 6/2019 | Aqrawi | ................... | G01V 1/302 |
| 2019/0302290 A1* | 10/2019 | Alwon | ................... | G01V 1/282 |
| 2020/0088897 A1* | 3/2020 | Roy | ..................... | G01V 1/306 |

FOREIGN PATENT DOCUMENTS

| | | | | |
|---|---|---|---|---|
| CN | 111666721 A | * | 9/2020 | ............. G06F 30/27 |
| WO | WO-2021116800 A1 | * | 6/2021 | ............. G01V 1/282 |

OTHER PUBLICATIONS

Li et al., Deep-Learning Inversion of Seismic Data, Mar. 2020, IEEE Transactions on Geoscience and Remote Sensing, vol. 58, pp. 2135-2149 (Year: 2020).*

(Continued)

*Primary Examiner* — Mischita L Henson
(74) *Attorney, Agent, or Firm* — Finnegan, Henderson, Farabow, Garrett & Dunner, LLP

(57) ABSTRACT

A computer-implemented method for obtaining reconstructed seismic data for determining a subsurface feature, includes: determining an initial training velocity model, training a machine learning model based on first training seismic data and second training seismic data generated from the training velocity model, the first training seismic data corresponding to one or more first frequencies, the second training seismic data corresponding to one or more second frequencies lower than the one or more first frequencies, obtaining, based on measured seismic data and the machine learning model, reconstructed seismic data corresponding to the one or more second frequencies, generating a velocity model based on the measured seismic data, the reconstructed seismic data, and a full waveform inversion (FWI), and when the generated velocity model does not satisfy a preset condition, updating the training velocity model based on the generated velocity model, to obtain updated reconstructed seismic data for determining a subsurface feature.

20 Claims, 15 Drawing Sheets

(56) References Cited

OTHER PUBLICATIONS

Wang et al., Full Waveform Inversion with the Reconstructed Wavefield Method, 2016, SEG International Exposition and 86th Annual Meeting, pp. 1237-1241 (Year: 2016).*

* cited by examiner

METHODS AND SYSTEMS FOR OBTAINING RECONSTRUCTED LOW-FREQUENCY SEISMIC DATA FOR DETERMINING A SUBSURFACE FEATURE

CROSS REFERENCE

This application is based upon and claims priority to U.S. Provisional Application No. 62/893,462, filed on Aug. 29, 2019, the content of which is hereby incorporated by reference in its entirety.

This invention was made with Government support under Award Number DE-SC0019665, awarded by the U.S. Department of Energy, Office of Science, SC-1. The Government has certain rights in the invention.

TECHNICAL FIELD

The present disclosure generally relates to the technical field of seismic data analysis and, more particularly, to methods and systems for obtaining reconstructed low-frequency seismic data for determining a subsurface feature.

BACKGROUND

Seismic exploration involves detection of subsurface features based on seismic data. The seismic data may be obtained by generating, e.g., using vibrators or explosive detonations, seismic energy that can travel through a subsurface and recording, e.g., using an array of sensors or receivers, the reflections of that energy after it has traveled through the subsurface. The recorded seismic data may then be processed using data-processing techniques to determine subsurface features.

For example, the seismic data may include various types of information related to geological characteristics of subsurface geological structures. The subsurface geological structures may include different components (e.g., rocks, underground water, oils, salts, ores, sands, or the like) that may have different properties (e.g., elasticity, electric conductivity, Young's modulus, or the like), which may affect characteristics (e.g., velocities, magnitudes, phases, frequencies, or the like) of the seismic waves that pass through them. By analyzing the seismic data, the above described subsurface features may be determined. Seismic data analysis may be used for geological exploration, such as exploration of hydrocarbon materials (e.g., oils), underground water, ores, or the like.

Full waveform inversion (FWI) is a seismic data processing method for subsurface velocity model building. Through a data-fitting procedure based on a nonlinear optimization algorithm, the FWI may convert measured seismic data to a velocity model. The velocity model is a representation of velocities of seismic waves at respective locations in a subsurface when the seismic waves travelling through the subsurface. Due to a correspondence between the velocities of the seismic waves and subsurface features in the subsurface, the velocity model may be used to represent subface features in the subsurface.

However, due to hardware limitations of equipment, some critical information of the seismic data may be lost in seismic data measurement or collection. For example, information related to low-frequency components of seismic waves may be difficult to record. Such lost information may cause artifacts or errors in the velocity model. Sometimes, those artifacts may be difficult to identify and may lead to improper interpretation of the subsurface features.

SUMMARY

One aspect of the present disclosure is directed to a computer-implemented method for obtaining reconstructed seismic data for determining a subsurface feature. The method includes: determining an initial training velocity model; training a machine learning model based on first training seismic data and second training seismic data generated from the training velocity model, the first training seismic data corresponding to one or more first frequencies, the second training seismic data corresponding to one or more second frequencies, the one or more second frequencies being lower than the one or more first frequencies; obtaining, based on measured seismic data and the machine learning model, reconstructed seismic data corresponding to the one or more second frequencies; generating a velocity model based on the measured seismic data, the reconstructed seismic data, and a full waveform inversion (FWI); and when the generated velocity model does not satisfy a preset condition, updating the training velocity model based on the generated velocity model, to obtain updated reconstructed seismic data for determining a subsurface feature.

Another aspect of the present disclosure is directed to a system. The system includes a processor and a memory storing instructions executable by the processor. The processor is configured to: determine an initial training velocity model; train a machine learning model based on first training seismic data and second training seismic data generated from the training velocity model, the first training seismic data corresponding to one or more first frequencies, the second training seismic data corresponding to one or more second frequencies, the one or more second frequencies being lower than the one or more first frequencies; obtain, based on measured seismic data and the machine learning model, reconstructed seismic data corresponding to the one or more second frequencies; generate a velocity model based on the measured seismic data, the reconstructed seismic data, and a full waveform inversion (FWI); and when the generated velocity model does not satisfy a preset condition, update the training velocity model based on the generated velocity model, to obtain updated reconstructed seismic data for determining a subsurface feature.

Yet another aspect of the present disclosure is directed to a non-transitory computer-readable storage medium. The non-transitory computer-readable storage medium may store therein instructions that, when executed by a processor of a device, cause the device to perform operations. The operations include: determining an initial training velocity model; training a machine learning model based on first training seismic data and second training seismic data generated from the training velocity model, the first training seismic data corresponding to one or more first frequencies, the second training seismic data corresponding to one or more second frequencies, the one or more second frequencies being lower than the one or more first frequencies; obtaining, based on measured seismic data and the machine learning model, reconstructed seismic data corresponding to the one or more second frequencies; generating a velocity model based on the measured seismic data, the reconstructed seismic data, and a full waveform inversion (FWI); and when the generated velocity model does not satisfy a preset condition, updating the training velocity model based on the generated velocity model, to obtain updated reconstructed seismic data for determining a subsurface feature.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of methods and devices consistent with aspects of the disclosure as recited in the appended claims.

Exemplary embodiments of the disclosure provide systems and methods for reconstructing low-frequency seismic data that may be absent from measured seismic data based on machine learning, and determining a subsurface feature based on the reconstructed low-frequency seismic data using, e.g., the full waveform inversion (FWI).

Figure 1:
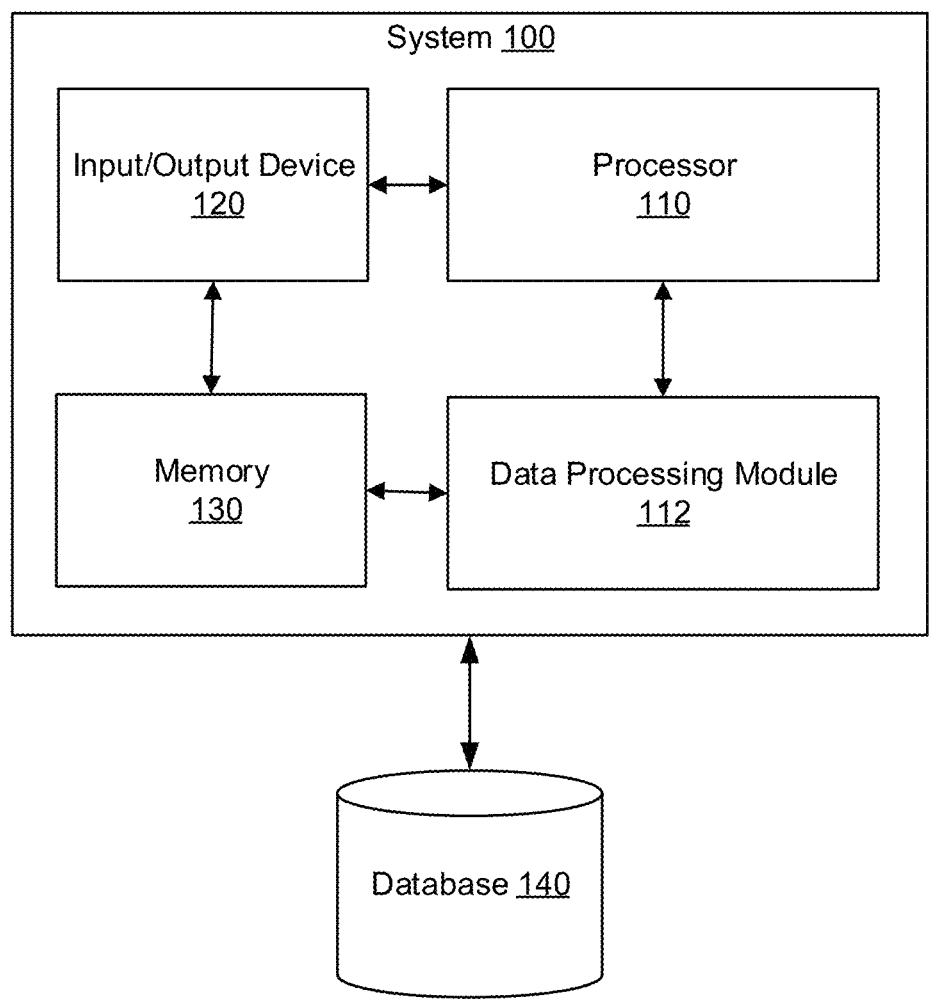
FIG. 1 is a block diagram of a system for obtaining reconstructed low-frequency seismic data for determining a subsurface feature, according to exemplary embodiments.

FIG. 1 is a block diagram of a system 100 for determining a subsurface feature based on reconstructed low-frequency seismic data, according to exemplary embodiments. System 100 may be one or more computing devices configured to execute software instructions stored in memory to perform one or more processes or methods described below. For example, system 100 may include one or more memory devices for storing data and software instructions and one or more hardware processors to analyze the data and execute the software instructions to perform seismic data analysis functions and operations.

In FIG. 1, system 100 includes a hardware processor 110, an input/output (I/O) device 120, and a memory 130. It should be noted that system 100 may include any number of those components and may further include any number of any other components. System 100 may be standalone, or it may be part of a subsystem, which may be part of a larger system. For example, system 100 may represent distributed servers that are remotely located and communicate over a network. In another example, system 100 may represent a standalone computer that is locally located.

Processor 110 may include or one or more known processing devices, such as, for example, a microprocessor. In some embodiments, processor 110 may include any type of single or multi-core processor, mobile device microcontroller, central processing unit, etc. In operation, processor 110 may execute computer instructions (e.g., program codes) and may perform functions in accordance with techniques described herein. Computer instructions may include routines, programs, objects, components, data structures, procedures, modules, and functions, which may perform particular processes described herein. In some embodiments, such instructions may be stored in memory 130, processor 110, or elsewhere.

I/O device 120 may be one or more devices configured to allow data to be received and/or transmitted by system 100. I/O device 120 may include one or more user I/O devices and/or components, such as those associated with a keyboard, mouse, touchscreen, display, etc. I/O device 120 may also include one or more digital and/or analog communication devices that allow system 100 to communicate with other machines and devices, such as other components of system 100. I/O device 120 may also include interface hardware configured to receive input information and/or display or otherwise provide output information. For example, I/O device 120 may include a monitor configured to display a customer interface.

Memory 130 may include one or more storage devices configured to store instructions used by processor 110 to perform functions related to disclosed embodiments. For example, memory 130 may be configured with one or more software instructions associated with programs and/or data.

Memory 130 may include a single program that performs the functions of the system 100, or multiple programs. Additionally, processor 110 may execute one or more programs located remotely from system 100. Memory 130 may also store data that may reflect any type of information in any format that the system may use to perform operations consistent with disclosed embodiments. Memory 130 may be a volatile or non-volatile (e.g., ROM, RAM, PROM, EPROM, EEPROM, flash memory, etc.), magnetic, semiconductor, tape, optical, removable, non-removable, or another type of storage device or tangible (i.e., non-transitory) computer-readable medium.

Consistent with the disclosed embodiments, system 100 includes a data processing module 112 configured to receive and process seismic data. Data processing module 112 may be implemented as software (e.g., program codes stored in memory 130), hardware (e.g., a specialized chip incorporated in or in communication with processor 110), or a combination of both. In some embodiments, data processing module 112 may include a machine learning model implemented as, e.g., a deep learning neural network.

System 100 may also be communicatively connected to a database 140. Database 140 may be a database implemented in a computer system (e.g., a database computer) that may be integrated in system 100 or be separated and in communication with system 100. Database 140 may include one or more memory devices that store information and are accessed and/or managed through system 100. By way of example, database 140 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. In one aspect, system 100 may include database 140. Alternatively, database 140 may be located remotely from the system 100. Database 140 may include computing components (e.g., database management system, database server, etc.) configured to receive and process requests for data stored in memory devices of database 140 and to provide data from database 140.

In exemplary embodiments, system 100 may process seismic data based on a full waveform inversion (FWI) process. The FWI process may perform data fitting based on a nonlinear optimization algorithm, such that subsurface features, e.g., a geological structure, may be determined when a difference between simulated seismic data (simulation data) and measured seismic data (measurement data) reaches a minimum. For example, a cost function of an FWI process in the frequency domain may be represented as Eq. (1):

$$c(v) = \sum_{f=1}^{N_f} \sum_{s=1}^{N_s} \sum_{r=1}^{N_r} \|S_{r,s,f}(v) - M_{r,s,f}\|^2 \qquad \text{Eq. (1)}$$

where S represents simulation data of a velocity model, M represents measurement data, and v represents velocities of subsurface seismic waves to be reconstructed. The subscripts f, s, and r represent indices of frequency, source, and receiver of the subsurface seismic waves, respectively. $N_s$, $N_r$, and $N_f$ represent numbers of sources, receivers, and frequencies of the subsurface seismic waves, respectively. c(v) represents a cost function value, which indicates a level of truthfulness of the velocity model. In some embodiments, $S_{r,s,f}(v)$ may have different levels of nonlinearity at different frequencies of the subsurface seismic waves. Typically, the higher the frequency of the subsurface seismic waves, the higher level of nonlinearity of $S_{r,s,f}(v)$ may be. In such cases, $S_{r,s,f}(v)$ may be referred to as having different levels of nonlinearity in its frequency domain.

In exemplary embodiments, to minimize c(v), a gradient of c(v) with respect to v may be determined, and the velocity model v may be updated in accordance with the gradient. For example, by performing a back-propagation procedure (e.g., a residual back-propagation procedure), the velocity model v may be updated such that the data discrepancy (e.g., $\|S_{r,s,f}(v)-M_{r,s,f}\|$) may be reduced. In some embodiments, the residual back-propagation procedure may be performed iteratively until the data discrepancy is within a predefined error tolerance. Until then, the FWI process may output the latest velocity model that represents the sought subsurface features.

In some embodiments, due to the nonlinear nature of the FWI, the minimization of the cost function in Eq. (1) may be unsuccessful when only measured seismic data, from which low-frequency seismic data may be absent, is used as an input to the FWI process. For example, the cost function value c(v) may become stagnant at a local minimum if the FWI process is initiated using $M_{r,s,f}$ at relatively high frequencies, or if the initial $S_{r,s,f}(v)$ is not sufficiently close to the true velocity model. In such cases, the local minimum of c(v) may remain outside the error tolerance, and the FWI process may generate velocities of the subsurface seismic waves having artifacts, referred to as a "cycle-skipping phenomenon."

Figure 2:
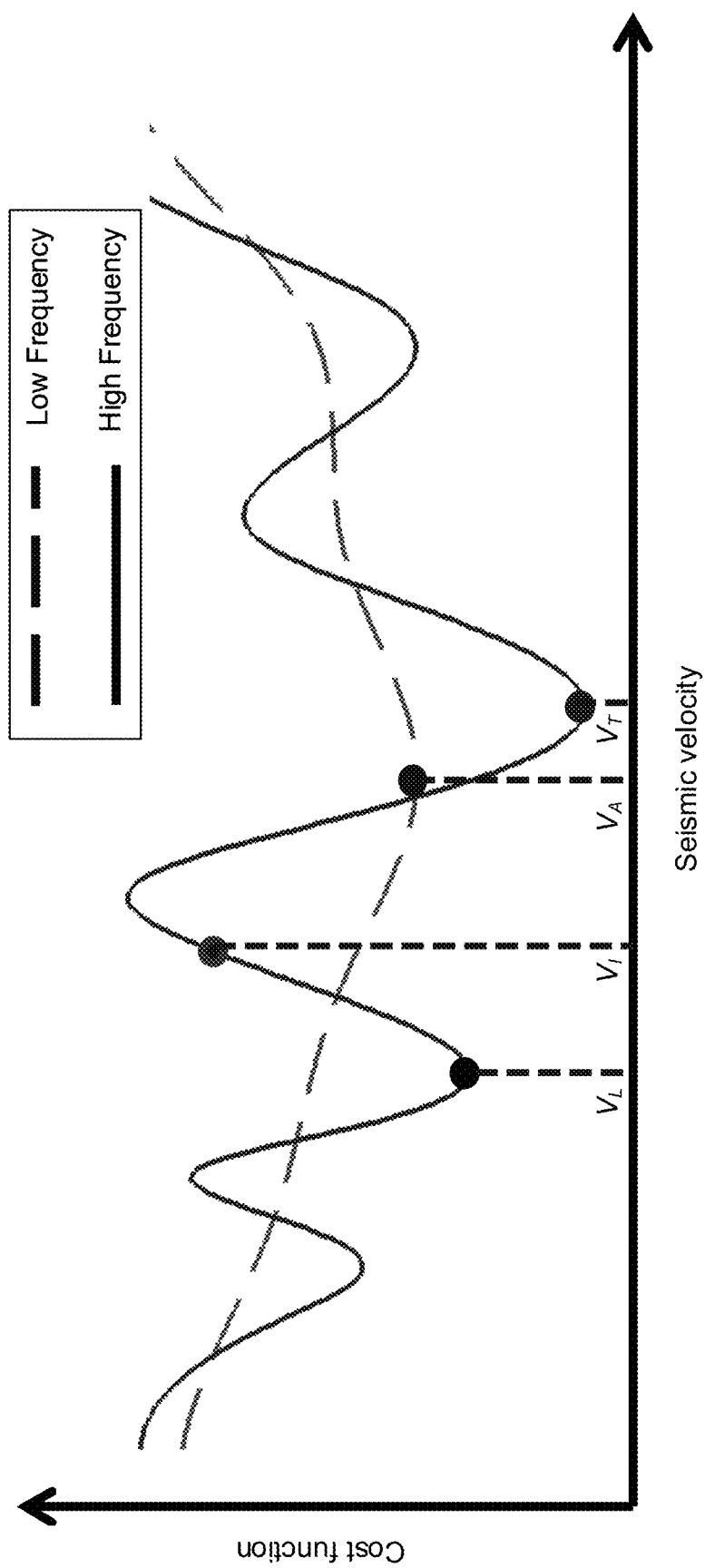
FIG. 2 is a graphical representation showing an example cycle-skipping phenomenon in an FWI process of seismic data, according to exemplary embodiments.

FIG. 2 is a graphical representation showing an example cycle-skipping phenomenon in the FWI process, according to an exemplary embodiment. In FIG. 2, the x-axis represents velocities (e.g., v in Eq. (1)) of subsurface seismic waves, and the y-axis represents cost function values (e.g., c(v) in Eq. (1)) of the FWI process. The dashed curve represents a cost function in a low-frequency domain (e.g., not exceeding 10 Hz), and the solid curve represents a cost function in a high-frequency domain (e.g., exceeding 10 Hz).

For the cost function in the high-frequency domain (i.e., the solid curve), $V_I$ represents an initial velocity where the FWI process initializes a velocity model reconstruction (e.g., $S_{r,s,f}(v)$ in Eq. (1)). Typically, the cost function value (e.g., $c(v)$ in Eq. (1)) corresponding to the initial velocity model is not at a minimum (e.g., a basin or valley of the solid curve). The goal of the FWI process is to converge the cost function value to a global minimum at $V_T$ in FIG. 2. However, if $V_I$ is not near $V_T$, the process may converge the cost value to a local minimum at $V_L$ instead of the global minimum, due to the relatively high nonlinearity of the cost function in the high-frequency domain. Such a local-minimum convergence may cause the cycle-skipping phenomenon in the FWI process, and lead to inaccurate or unsuccessful minimization of the cost function.

For the cost function in the low-frequency domain (i.e., the dashed curve), $V_A$ represents a global minimum of the cost values in the low-frequency domain. Compared with the cost function in the high-frequency domain (i.e., the solid curve), the cost function in the low-frequency domain generally has a lower level of nonlinearity (e.g., relatively smooth in FIG. 2), which may translate to a higher likelihood of finding a global minimum of the cost values in the low-frequency domain, thereby avoiding the cycle-skipping phenomenon.

Accordingly, in exemplary embodiments, low-frequency seismic data may first be reconstructed from measured seismic data using a trained machine learning network, and the FWI process may be performed on the reconstructed low-frequency seismic data and the measured high-frequency seismic data to determine subsurface features. For example, as will be further described below, the FWI process may be performed in first and second stages in series or in parallel. In the first stage, the FWI process may be performed on the low-frequency data to converge the cost function to a global minimum in its low-frequency domain. The FWI process may output a low-resolution velocity model after the first stage. In the second stage, the FWI process may initialize the low-resolution velocity model using a velocity corresponding to the global minimum of the cost function in the low-frequency domain and determine a global minimum in the high-frequency domain. The FWI process may output a high-resolution velocity model after the second stage.

In exemplary embodiments, machine learning may be based on an algorithm or a statistical model that may parse data, understand and identify patterns in the data, learn a relationship between input and output data in an automatic and exhaustive way that is impractical or infeasible for a human being, and then predict a value of new data. Deep learning may be a subset of the machine learning and may use multi-layer neural network architecture for automatic decision making and feature extraction with minimal human intervention.

Figure 3:
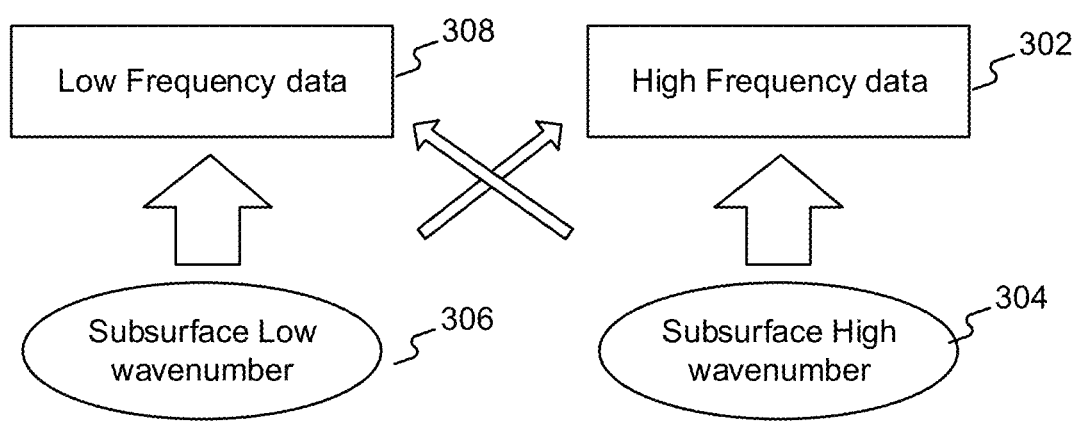
FIG. 3 is a schematic diagram showing a relationship between seismic data and wavenumber components of subsurface structures, according to exemplary embodiments.

In exemplary embodiments, the machine learning network may be a deep learning network, and may be generated based on a relationship between seismic data and wavenumber components of subsurface structures. FIG. 3 is a schematic diagram showing this relation according to an exemplary embodiment. For example, as illustrated in FIG. 3, high-frequency data 302 may be mainly contributed from subsurface high wavenumber structures 304 (represented by a wide arrow therebetween) and weakly contributed from low wavenumber structures 306 (represented by a narrow arrow therebetween). Also, for example, low-frequency data 308 may be mainly contributed from the subsurface low wavenumber structures 306 represented by a wide arrow therebetween) and weakly contributed from the high wavenumber structures 304 (represented by a narrow arrow therebetween).

In some embodiments, to reduce a computing burden of feature extraction on the machine learning, a beat tone method may be used to amplify the connection between low wavenumber structures and high-frequency data, thereby to strengthen links between the low-frequency data, the low-wavenumber components of the subsurface structures, and the high-frequency data. The beat tone method may amplify low-wavenumber information buried in the high-frequency data to generate beat tone data. For example, the beat tone method may utilize seismic data corresponding to two slightly different high frequencies to implicitly reduce the number of phase wrapping occurrences, and generate beat tone data showing a slow spatial phase variation pattern similar to true low frequency data.

In exemplary embodiments, the beat tone method may determine beat tone data according to Eq. (2) as follows:

$$\Phi_{BT}(S_2,S_1)=\Phi(S_2)-\Phi(S_1) \quad\quad \text{Eq. (2),}$$

where $S_1$ and $S_2$ represent frequency domain data corresponding to frequencies $f_1$ and $f_2$, respectively, $\Phi$ represents a phase function, and $\Phi_{BT}$ is the determined beat tone phase data. For example, $S_1$ may be $S_1=\cos(2\pi f_1 t)$, and $S_2$ may be $S_2=\cos(2\pi f_2 t)$. Also, for example, $|f_1-f_2|\ll f_1, f_2$.

Figure 4:
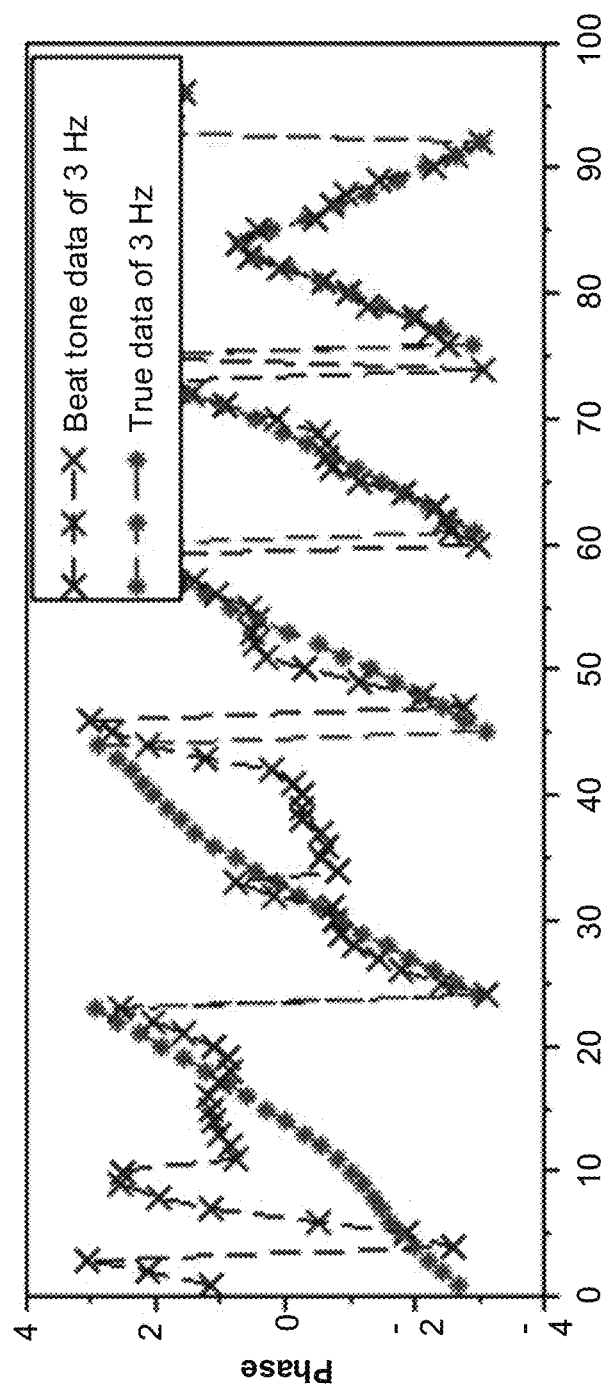
FIG. 4 is a graphical representation of comparison between beat tone data and true low-frequency data, according to exemplary embodiments.

FIG. 4 is a graphical representation of comparison between beat tone data and corresponding low-frequency data, according to exemplary embodiments. In FIG. 4, the star-dash line represents true 3-Hz low-frequency data in an experiment, and the cross-dash line represents beat tone data derived (e.g., in accordance with Eq. (2)) from 8-Hz high-frequency data and 5-Hz high-frequency data. As shown in FIG. 4, the beat tone data is an approximation to the true low-frequency data.

Figure 5:
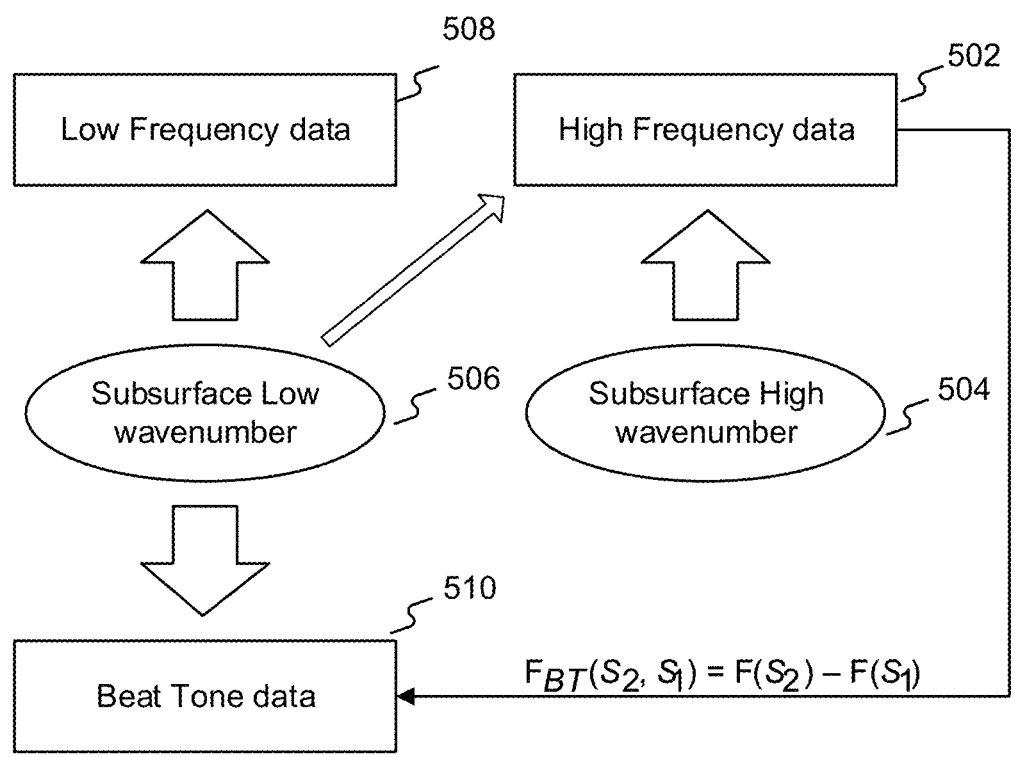
FIG. 5 is a schematic diagram showing a relationship between high-frequency data, low-frequency data, beat tone data, and wavenumber components of subsurface structures, according to exemplary embodiments.

FIG. 5 is a schematic diagram showing a relationship between high-frequency data, low-frequency data, beat tone data, and wavenumber components of subsurface structures, according to exemplary embodiments. As shown in FIG. 5, high-frequency data 502 may be mainly contributed from subsurface high-wavenumber structures 504, represented by a wide arrow therebetween, and low-frequency data 506 may be mainly contributed from subsurface low-wavenumber structures 508, represented by a wide arrow therebetween. As beat tone data is an approximation to the low-frequency data, as illustrated above in FIG. 4, beat tone data 510 may also be considered being mainly contributed from the subsurface low-wavenumber structures 506, represented by a wide arrow therebetween, and used to model the low wavenumber structures.

As shown in FIG. 5, the beat tone data 510 may be derived from the high-frequency data 502, e.g., in accordance with Eq. (2). Effectively, the beat tone data may strengthen the relationship between the low-frequency data and the high-frequency data through the subsurface low-wavenumber structures. Accordingly, by using both the high-frequency data and the beat tone data as inputs, the low-frequency data may be predicted with less complexity without sacrificing prediction accuracy because of additional information introduced by the similarity between the beat tone data and the low-frequency data. By introducing the beat tone data, a computing burden of feature extraction on the machine learning for predicting low-frequency data may be reduced.

Figure 6A:
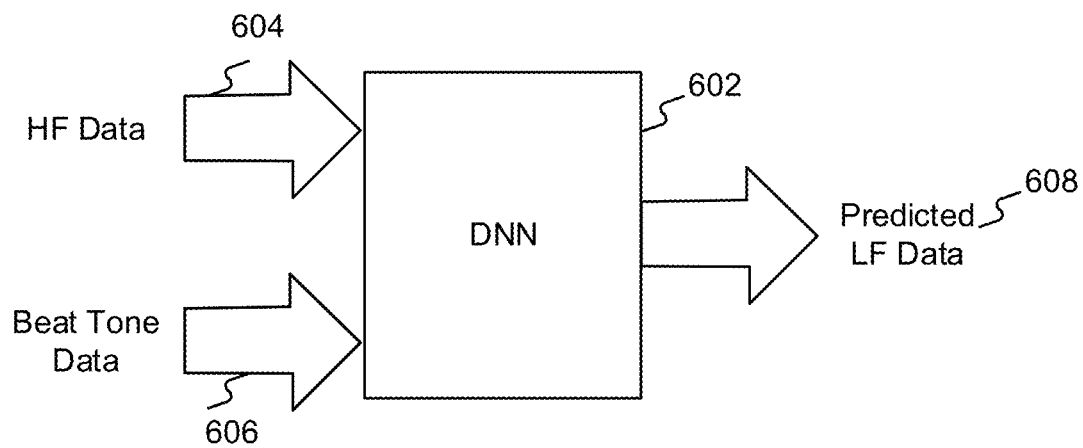
FIGS. 6A and 6B are schematic diagrams of machine learning models for predicting low-frequency data, according to exemplary embodiments.

FIG. 6A is a schematic diagram of a machine learning (ML) model 602 for predicting low-frequency data, according to exemplary embodiments. In some embodiments, the machine learning model may be implemented as at least one of a deep neural network (DNN), a convolutional neural network, a fully connected neural network, a random forest model, a support vector machine model, or a gradient boosting model. For illustrative purposes only, the DNN is used as an example in the following description, and the DNN may be a deep inception based convolutional network (e.g., an inception-v4 network, an inception-ResNet network, or the like). The ML model 602 has a dual data-feed structure to receive both high-frequency (HF) data 604 and beat tone data 606 and output predicted low-frequency (LF) data 608. In some embodiments, the ML model 602 may be trained using a selected training velocity model and corresponding training data. For example, the training process of the ML model 602 may be set up as an optimization problem minimizing the following loss function in Eq. (3):

$$\min_c \|f(s_{HF}, s_{BT}, c) - s_{LF}\|_2^2 \qquad \text{Eq. (3)},$$

where $f(s_{HF}, s_{BT}, c)$ represents the ML model output. $S_{HF}$ and $S_{BT}$ are high-frequency training data and beat tone training data that is derived from the high-frequency training data, respectively. $S_{HF}$ and $S_{BT}$ may be input into the ML model as shown in FIG. 6A. $s_{LF}$ is ground truth low-frequency training data. In accordance with Eq. (3), given $S_{LF}$, the parameter c of the ML model output may be solved. The ground truth data may be objective data (e.g., generated and known) in a supervised learning process to prove or disprove the learning results. The ground truth data may be used as a reference or gauge that is independently generated in a process other than the supervised learning, and thus may be independently ensured to be reliable as the reference or the gauge.

In the embodiments, by using the dual data-feed structure, the connection between the subsurface low-wavenumber structures and the high-frequency data may be amplified, and thus may extract the nonlinear relationship between the low-frequency data and the high-frequency data through low-wavenumber components of subsurface structures.

Figure 6B:
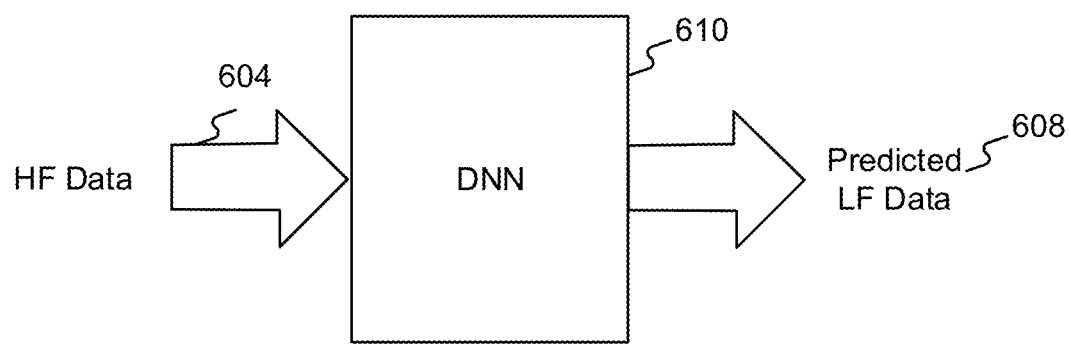

In some embodiments, the ML model may have a single data-feed structure to receive only HF data 604 as input. FIG. 6B is a schematic diagram of an ML model 610 for predicting low-frequency data, according to exemplary embodiments. In FIG. 6B, ML model 610 may be similar to ML model 602 in FIG. 6A except that it only receives HF data 604 as input.

In exemplary embodiments, a computer system (e.g., system 100 in FIG. 1) may be used for training the ML model. For example, computer instructions stored in a non-transitory medium (e.g., memory 130 or data processing module 112 in FIG. 1) may be executed by a processor (e.g., processor 110 in FIG. 1) to perform the training.

Figure 7:
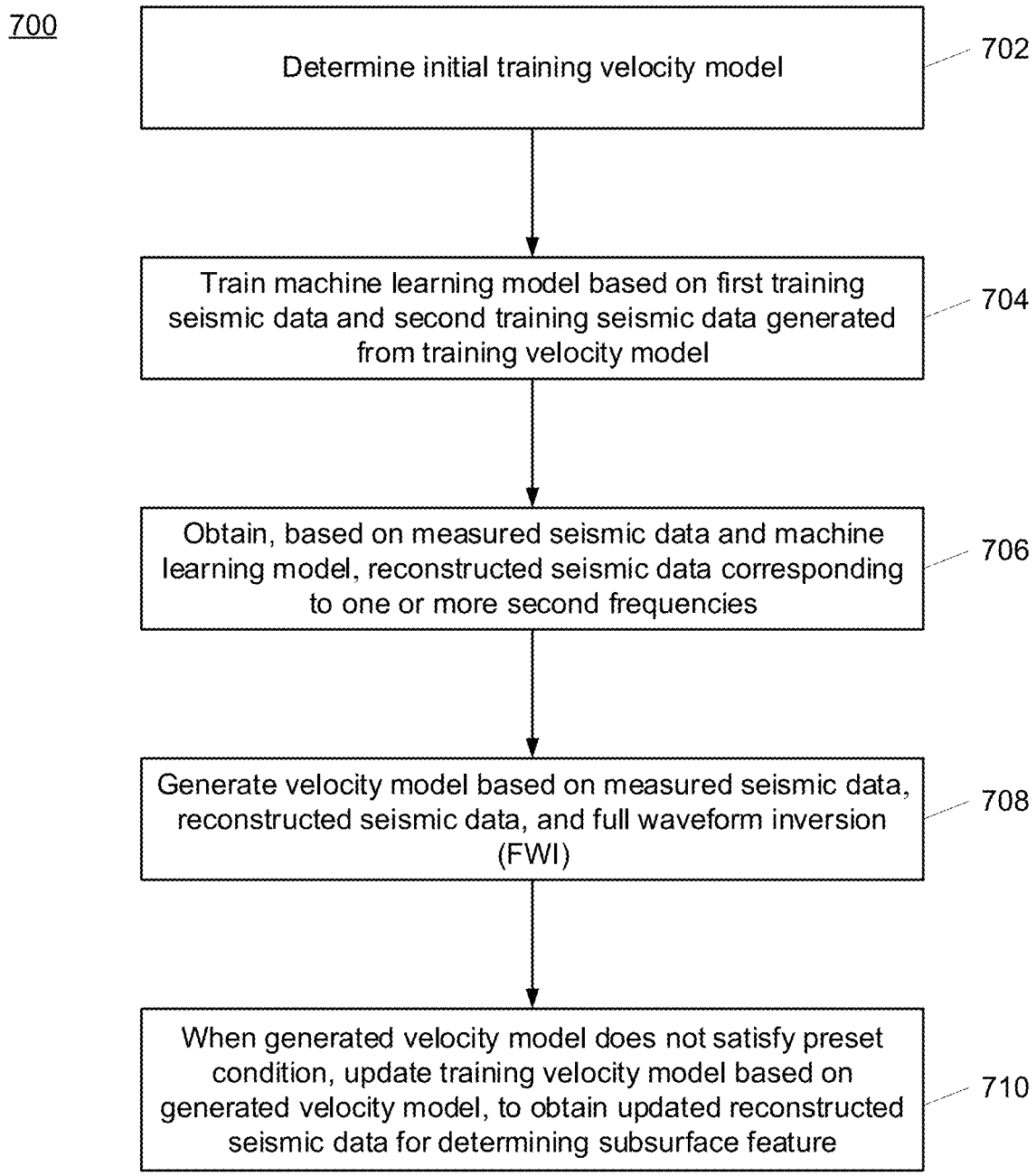
FIG. 7 is a flowchart of a method for training the machine learning model, according to exemplary embodiments.

FIG. 7 is a flowchart of a method 700 for training the ML model, such as a DNN, according to exemplary embodiments.

Figure 8A:
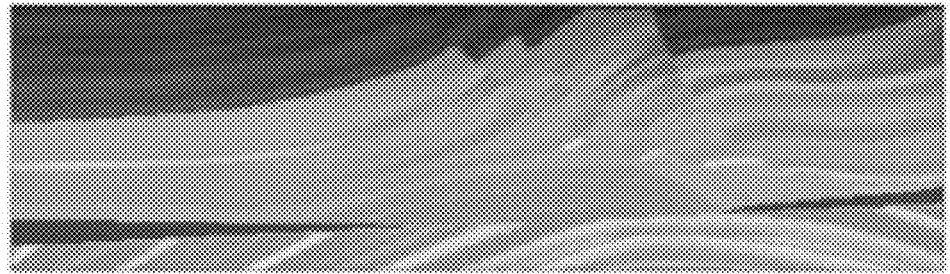
FIGS. 8A and 8B are graphical representations showing a true velocity model to be reconstructed and a selected training velocity model, respectively, according to exemplary embodiments.
Figure 8B:
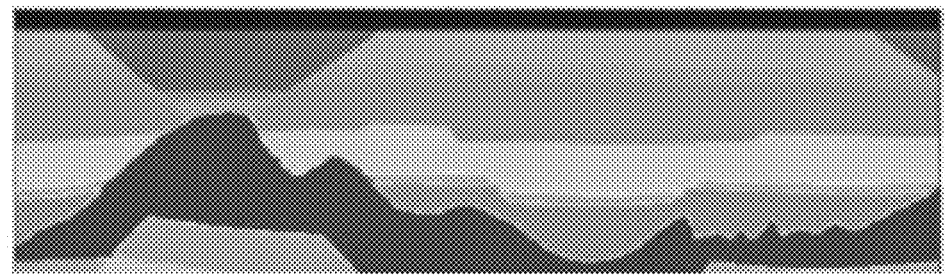

At step 702, a velocity model may be determined as an initial training velocity model. The velocity model may be randomly selected or generated based on priori knowledge about the subsurface geological and/or geophysical environments and properties, may be completely different from the true velocity model (thus subsurface features) to be reconstructed, and may be similar to the true velocity model to be reconstructed if possible. FIG. 8A is a graphical representation showing a true velocity model to be reconstructed by FWI and FIG. 8B is a graphical representation showing a training velocity model used for the machine-learning network model training, according to exemplary embodiments. For example, the training velocity model may be generated in a simulation.

At step 704, a machine learning model may be trained based on first training seismic data and second training seismic data that are generated from the training velocity model. In some embodiments, the first training seismic data may correspond to one or more first frequencies, and the second training seismic data may correspond to one or more second frequencies lower than the one or more first frequencies.

In some embodiments, a seismic forward modeling (simulation) may be performed on the training velocity model to generate the first training seismic data and the second training seismic data. For example, a frequency lower than or equal to a frequency threshold may be considered a low frequency (i.e., the second frequency), and a frequency higher than the frequency threshold may be considered a high frequency (i.e., the first frequency). In some embodiments, the frequency threshold may be a predetermined frequency, such as 5 Hz, 10 Hz, etc. In some embodiments, the frequency threshold may be determined based on measured seismic data. For example, if frequency components lower than a certain frequency lack in the measured seismic data, that certain frequency may be determined as the frequency threshold.

Figure 9:
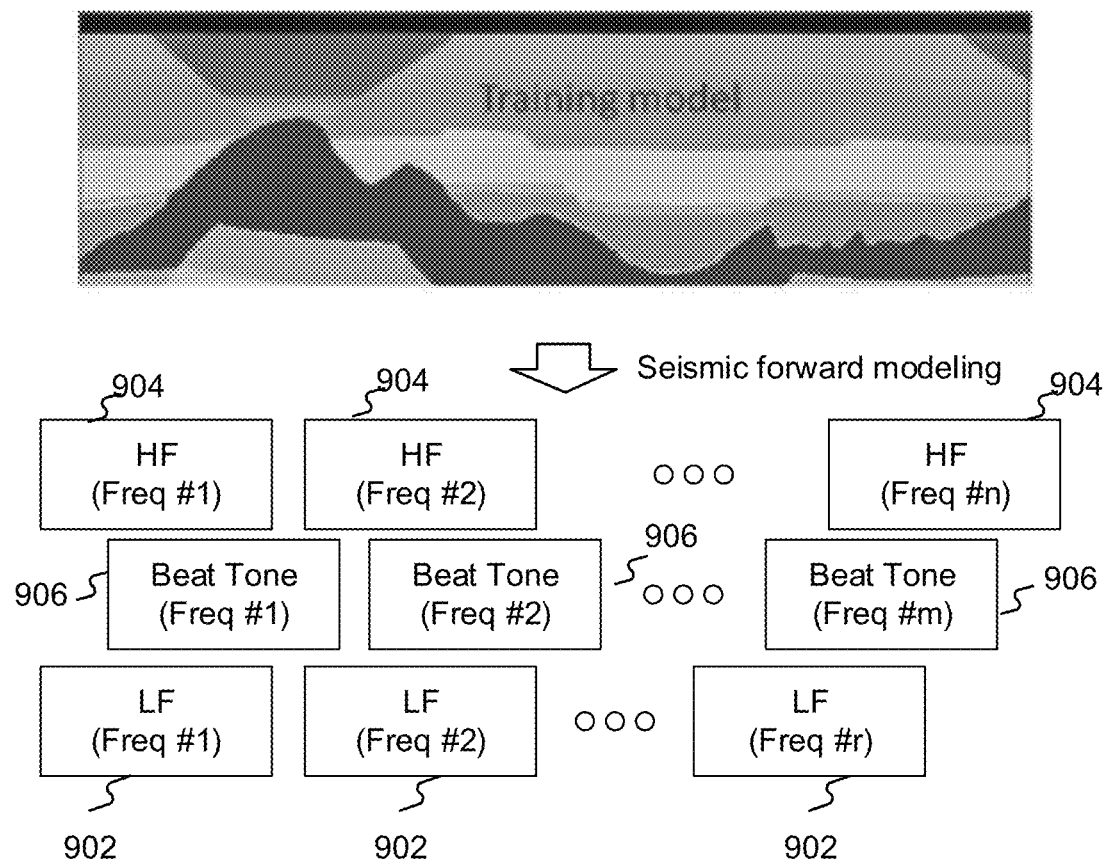
FIG. 9 is a schematic diagram showing generating, from a training model, a set of synthetic seismic data, according to exemplary embodiments.

In exemplary embodiments, the seismic forward modeling may use a finite-difference time-domain (FDTD) method, a finite element method (FEM), a boundary element method, an integral equation method, a spectral element method, a pseudo spectral method, a fast multipole method, a method of lines, a finite volume method, a meshfree method, or a discontinuous Galerkin method, or any other computational method known in the art, to calculate the seismic data. An excitation source used in the seismic forward modeling may be based on an actual excitation source that is used to generate measured seismic data. FIG. 9 is a schematic diagram showing generating, from the training model, a set of synthetic seismic data including low-frequency (LF) training data 902 and high-frequency training data 904, and beat tone data 906 derived from the high-frequency training data 904, according to exemplary embodiments.

In some embodiments, after determining the first training seismic data and the second training seismic data, the high-frequency training data may be fed into the machine learning model (e.g., DNN) to generate predicted low-frequency data, and the predicted low-frequency data may be further compared with the low-frequency training data to determine a difference between the predicted low-frequency data and the low-frequency training data. In an embodiment, the set of synthetic seismic data also includes the beat tone data, and the beat tone data is also fed into the DNN to generate the predicted low-frequency data. In another embodiment, the set of synthetic seismic data does not include the beat tone data, and the predicted low-frequency data is generated without the beat tone data.

In an exemplary embodiment, the machine learning model may be trained as follows. By inputting the first training seismic data to the machine learning model, predicted seismic data corresponding to the one or more second frequencies may be determined. Then, whether a difference between the predicted seismic data and the second training seismic data exceeds a threshold may be determined. If the difference exceeds the threshold, a parameter of the machine learning model may be updated. The aforementioned operations may be repeated or iterated until the difference does not exceed the threshold, until when the machine learning model may be deemed as trained.

In another exemplary embodiment, the machine learning model may be trained as follows. Beat tone training data may be determined from the first training seismic data. Then, by inputting the first training seismic data and the beat tone training data to the machine learning model, the predicted seismic data corresponding to the one or more second frequencies may be determined. Further, whether a difference between the predicted seismic data and the second training seismic data exceeds a threshold may be determined. If the difference exceeds the threshold, a parameter of the machine learning model may be updated. The aforementioned operations may be repeated or iterated until the difference does not exceed the threshold, until when the machine learning model may be deemed as trained.

Still referring to FIG. 7, at step 706, based on measured seismic data and the machine learning model, reconstructed seismic data corresponding to the one or more second frequencies may be obtained. In some embodiments, when the difference between the predicted seismic data and the second training seismic data does not exceed the threshold, the reconstructed seismic data may be determined by inputting the measured seismic data to the machine learning model.

At step 708, a velocity model may be generated based on the measured seismic data, the reconstructed seismic data, and the full waveform inversion (FWI). In some embodiments, an initial FWI velocity model may be determined for the FWI. In some embodiments, a low-resolution velocity model may then be generated by using the reconstructed seismic data and the initial FWI velocity model as inputs to the FWI. A high-resolution velocity model may then be generated by using the measured seismic data and the low-resolution velocity model as inputs to the FWI. In some embodiments, the high-resolution velocity model may be generated without generating the low-resolution velocity model, by simultaneously inputting the reconstructed seismic data (low frequency data) and the measured seismic data (high frequency data) to the FWI.

At step 710, when the generated velocity model does not satisfy a preset condition, the training velocity model may be updated based on the generated velocity model to obtain updated reconstructed seismic data for determining a subsurface feature. In some embodiments, if the high-resolution velocity model determined at step 708 satisfies the preset condition, the high-resolution velocity model may be determined as a representation of the subsurface feature. In some other embodiments, if the high-resolution velocity model does not satisfy the preset condition, the training velocity model may be updated based on at least one of the low-resolution velocity model or the high-resolution velocity model.

In some embodiments, after step 710, in response to the training velocity model being updated, the first training seismic data and the second train seismic data may be updated to further train the machine learning model.

Figure 10:
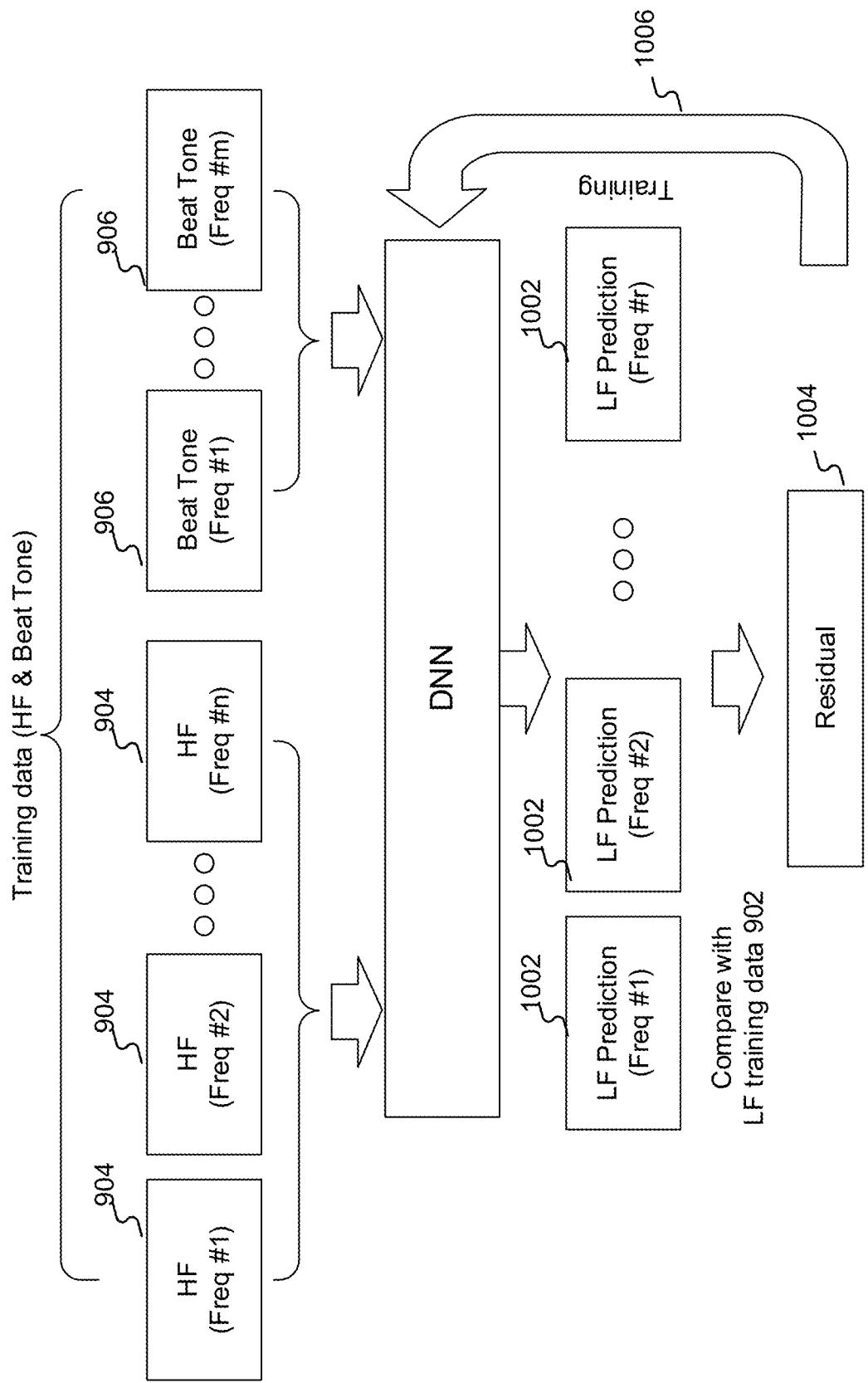
FIG. 10 is a schematic diagram showing a machine learning network training process according to exemplary embodiments.

FIG. 10 is a schematic diagram showing a machine learning network training process according to exemplary embodiments. Referring to FIG. 10, the high-frequency training data 904 and beat tone data 906 are fed into the DNN to generate predicted low-frequency data 1002, and the predicted low-frequency data 1002 is further compared with the low-frequency training data 902 to determine if a difference between the predicted low-frequency data 1002 and the low-frequency training data 902, such as a residual 1004, exceeds a predefined error tolerance, and if so, one or more parameters of the DNN are updated (1006).

Figure 11:
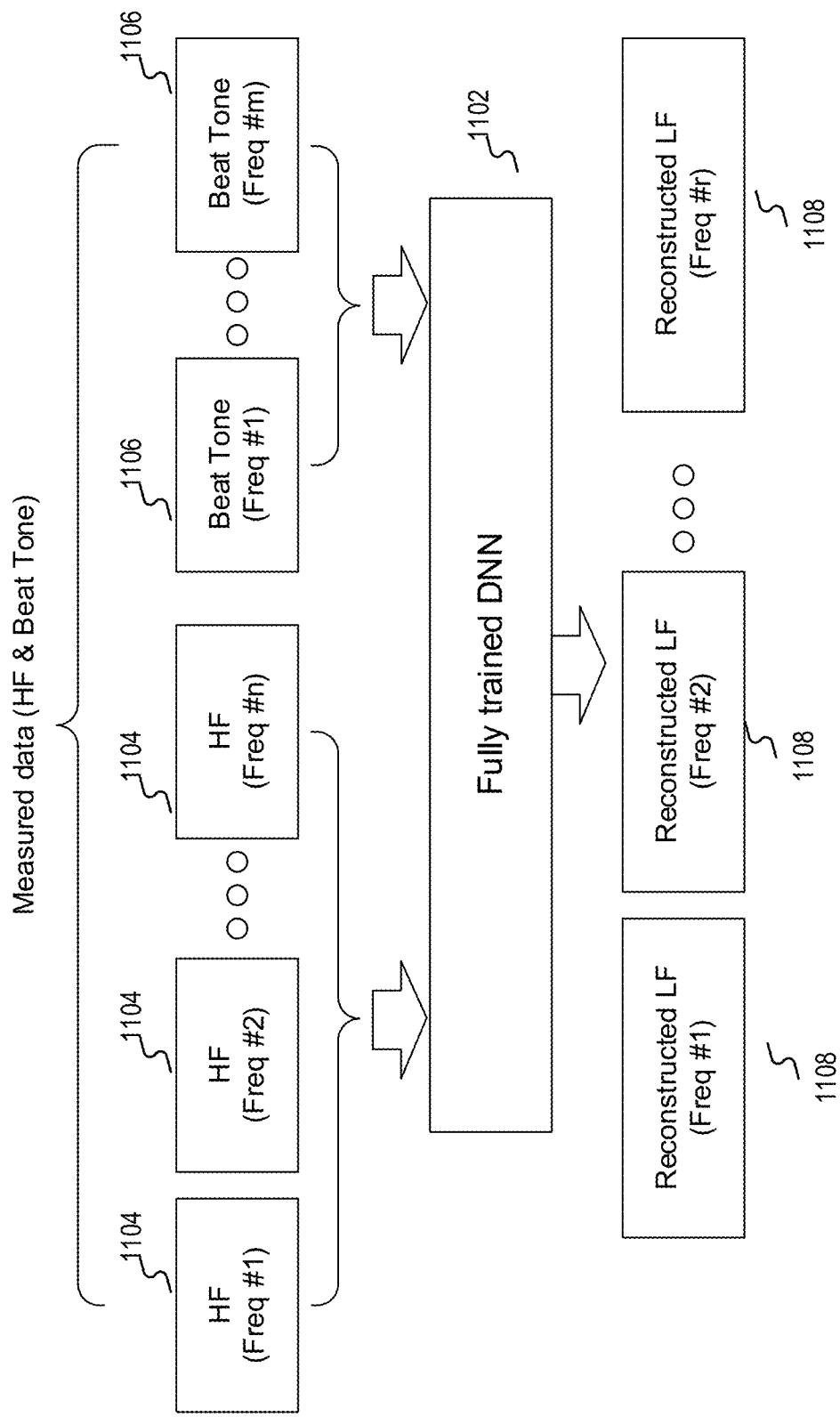
FIG. 11 is a schematic diagram showing input and output of a fully trained machine learning network according to exemplary embodiments.

When the difference between the predicted low-frequency data and the training low-frequency data is within the predefined error tolerance, the DNN is considered fully trained. FIG. 11 is a schematic diagram showing input and output of a fully trained DNN 1102 according to exemplary embodiments. In the embodiment, measured high-frequency seismic data 1104 and beat tone data 1106 derived from the measured high-frequency data 1104 may be input into the DNN 1102 to reconstruct low-frequency seismic data 1108.

Figure 12A:
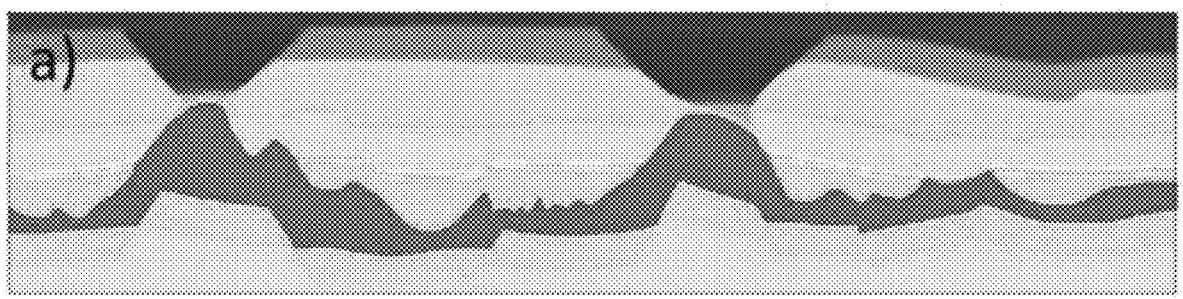
FIG. 12A is a graphical representation showing a true velocity model, according to exemplary embodiments.
Figure 12B:
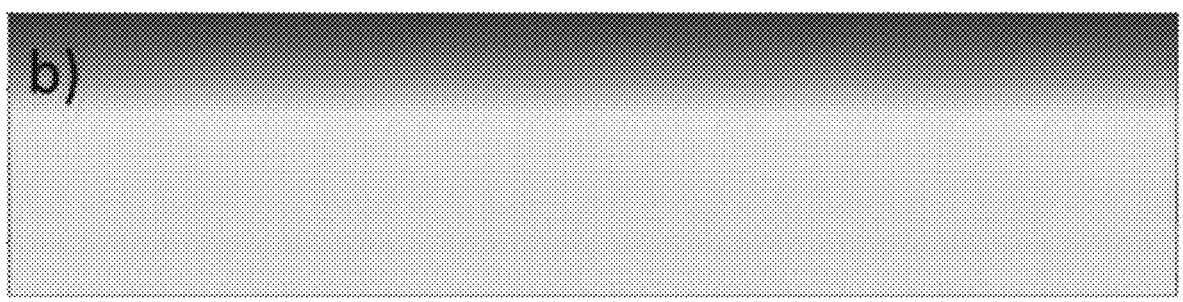
FIG. 12B is a graphical representation showing an initial FWI velocity model for an FWI process, according to exemplary embodiments.
Figure 12C:
FIG. 12C is a graphical representation showing a training velocity model for generating training data to train a machine learning model, according to exemplary embodiments.

FIGS. 12A-12C are graphical representations showing a true velocity model, an initial velocity model for an FWI process, and a training velocity model for training an ML model, such as a DNN, to use reconstructed low-frequency seismic data in the FWI process, according to exemplary embodiments.

In FIG. 12A, the true velocity model may represent true subsurface features, such as subsurface geological structures and geophysical properties.

In FIG. 12B, the initial velocity model may be used in the FWI process as a starting point of optimization (e.g., as the starting point of $S_{r,s,f}(v)$ in Eq. (1)). The initial velocity model in FIG. 12B may be different from the true velocity model in FIG. 12A. In some embodiments, the initial velocity model of FIG. 12B may be arbitrarily selected or generated based on priori knowledge.

In FIG. 12C, the training velocity model may generate training data to train an ML model, such as the ML model 602 (FIG. 6A or 6B) that uses a dual data-feed structure. In some embodiments, the ML model may use a single data-feed structure, e.g., only takes high-frequency data as input. In some embodiments, the training velocity model in FIG. 12C may also be arbitrarily selected. In some embodiments, the training velocity model may also be generated based on priori knowledge.

In some embodiments, to generate the training data, a processor (e.g., processor 110 of FIG. 1) may perform a seismic forward simulation (e.g., a forward modeling simulator implemented as program codes stored in memory 130 or data processing module 112 of FIG. 1) on the training velocity model. For example, the seismic forward simulation may use a finite-difference time-domain (FDTD) method, a finite element method (FEM), a boundary element method, an integral equation method, a spectral element method, a pseudo spectral method, a fast multipole method, a method of lines, a finite volume method, a meshfree method, or a discontinuous Galerkin method, or any other computational method known in the art. The training data may be simulated seismic data. The training data may include high-frequency training data that includes high-frequency components of the simulated seismic data and low-frequency training data that includes low-frequency components of the simulated seismic data.

In some embodiments, if the ML model uses a dual data-feed structure, the processor may further derive beat-tone training data (e.g., in accordance with Eq. (2)) from the high-frequency training data. In some embodiments, each of the low-frequency training data, high-frequency training data, and beat-tone training data may be a dataset that includes multiple data entries.

For example, each entry of the beat-tone training dataset may be derived from a pair of data entries of the high-frequency training dataset. For example, a low-frequency component in the low-frequency training dataset may be at 3 Hz, and the high-frequency components in the high-frequency training dataset may range from 10 Hz to 18 Hz with an interval of 0.5 Hz. Based on the low-frequency component at 3 Hz, the beat tone dataset may be derived from the high-frequency component pairs with Δf=3 Hz, such as pairs of 10 Hz and 13 Hz, 10.5 Hz and 13.5 Hz, 11 Hz and 14 Hz, and so on.

After generating training datasets, the processor may start training the ML model. For example, if the ML model uses a single data-feed structure, the processor may feed the high-frequency training dataset to the ML model to generate predicted low-frequency data. In another example, if the ML model uses a dual data-feed structure, the processor may feed the high-frequency training dataset and the beat-tone training dataset to the ML model to generate the predicted low-frequency data.

After determining predicted low-frequency data, the processor may further determine residual data using the predicted low-frequency data and low-frequency training data. For example, if the ML model uses a dual data-feed structure, high-frequency training data and beat-tone training data may be input to the ML model, which may generate predicted low-frequency data. The processor may determine a difference between the predicted low-frequency data and the low-frequency training data. If the difference value exceeds a threshold value (e.g., representing a preset error tolerance), the processor may update one or more parameters of the ML model and repeat the training process by generating next predicted low-frequency data. In some embodiments, the parameters of the ML model may be updated by a back-propagation process, such as a gradient-descending algorithm for minimizing a loss function (e.g., the loss function in Eq. (3)). Such an iteration process may be performed for each entry of the high-frequency training dataset and the beat-tone training dataset, the resulting difference values of which may form a residual dataset. The training process may be repeated until no entry of the residual dataset has a value exceeding the threshold value, in which case the ML model may be deemed as successfully trained.

For example, if the ML model uses a dual data-feed structure, the processor may input high-frequency training data and beat tone data derived from high-frequency training data with $\Delta f=3$ Hz to the ML model for training. The processor may also use the low-frequency training data at 3 Hz as ground truth data for training the ML model. In such cases, the successfully trained ML model may be used to predict 3 Hz low-frequency seismic data from measured high-frequency seismic data. It should be noted that the processor may predict low-frequency components at any frequency of the seismic data in accordance with similar procedures.

After successfully training the ML model, the processor may receive through an interface (e.g., I/O device 120 of FIG. 1) a measured high-frequency dataset of seismic data and reconstruct a corresponding low-frequency dataset by inputting the measured high-frequency dataset to the trained ML model. In some embodiments, if the ML model uses a dual data-feed structure, the processor may further determine a measured beat tone dataset corresponding to the measured high-frequency dataset. The processor may then input the measured high-frequency dataset and the measured beat tone dataset to the trained ML model, which may generate the low-frequency dataset as reconstructed low-frequency data.

After generating the low-frequency dataset using the ML model, the processor may input the low-frequency dataset to an FWI process (e.g., an FWI engine implemented as program codes stored in memory 130 or data processing module 112 of FIG. 1) to perform velocity model inversion. For example, the processor may input the generated low-frequency dataset and an initial velocity model (e.g., the initial velocity model of FIG. 12B) into the FWI engine. Such an FWI process using the low-frequency dataset may be referred to as a low-frequency FWI ("LF-FWI"). For example, the LF-FWI may be similar to finding a global minimum of the cost function in the low-frequency domain as described in FIG. 2. The LF-FWI may output a low-resolution ("LR") velocity model.

After the LF-FWI, the processor may further input the measured high-frequency dataset to the LR velocity model to generate a high-resolution ("HR") velocity model. For example, the processor may input the measured high-frequency dataset and the LR velocity model into the FWI engine. Such an FWI process using the high-frequency dataset may be referred to as a "high-frequency FWI" ("HF-FWI"). For example, the HF-FWI may be similar to finding a global minimum of the cost function in the high-frequency domain as described in FIG. 2.

Figure 13A:
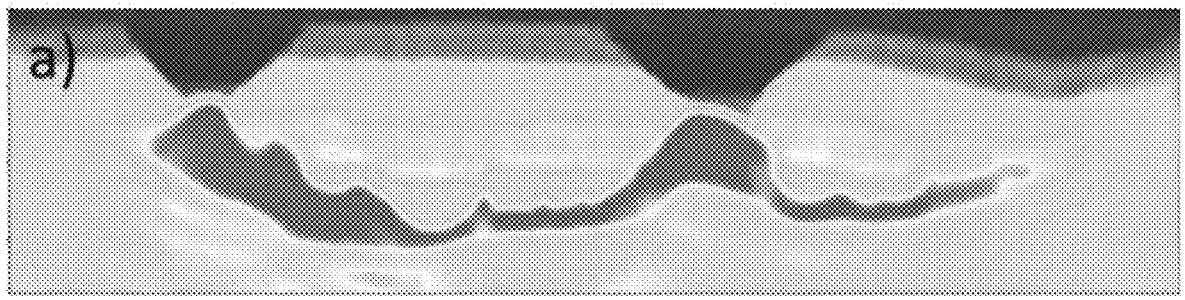
FIG. 13A is a graphical representation showing a high-resolution (HR) velocity model obtained by FWI using machine-learning-reconstructed low-frequency data and measured high-frequency data, according to exemplary embodiments.
Figure 13B:
FIG. 13B is a graphical representation showing a reference HR velocity model obtained by FWI using true low-frequency data and high-frequency data, according to exemplary embodiments.
Figure 13C:
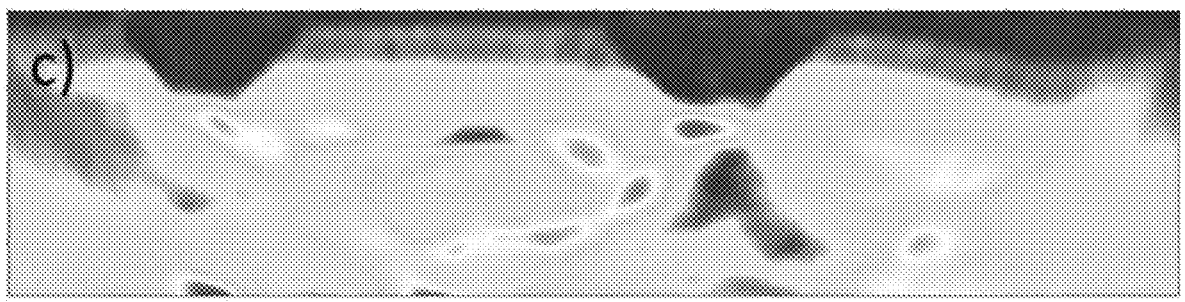
FIG. 13C is a graphical representation showing an HR velocity model obtained by FWI using only measured high-frequency data, according to exemplary embodiments.

FIGS. 13A-13C illustrate accuracy of the high-resolution velocity model generated based on the trained ML model, according to exemplary embodiments. In the embodiments, ideal measured seismic data may be calculated from a numerical experiment to include both low-frequency data (e.g., ranging from 3 Hz to 10 Hz) and high-frequency data (e.g., ranging from 10 Hz to 30 Hz). For example, the numerical experiment may calculate measured seismic data from known subsurface features. Also for example, the known subsurface features may correspond to the true velocity model of FIG. 12A. In the embodiments, as the measured seismic data is calculated from the numerical experiment, the seismic data may include both low-frequency data and high-frequency data, ranging from 3 Hz to 30 Hz.

FIG. 13A is a graphical representation showing a high-resolution (HR) velocity model generated by FWI based on the measured high-frequency data and reconstructed low-frequency data, the low-frequency data being reconstructed from the measured high-frequency data using the trained ML model. For example, the reconstructed low-frequency data may be generated by inputting the measured high-frequency data and beat tone data derived from the measured high-frequency data to the trained ML model that uses the dual data-feed structure. FIG. 13B is a graphical representation showing a reference HR velocity model generated based on the measured high-frequency data and the measured low-frequency data, ranging from 3 Hz to 30 Hz.

As shown in FIGS. 13A and 13B, the HR velocity model in FIG. 13A and the reference HR velocity model in FIG. 13B are close, which shows the accuracy of the HR velocity model generated by the FWI process that uses the low-frequency data reconstructed by the trained ML model.

As a comparison, FIG. 13C is a graphical representation showing an HR velocity model generated based on only the measured high-frequency data. The HR velocity model in FIG. 13C is very different from the reference HR velocity model in FIG. 13B. In FIG. 13C, although the FWI process almost successfully recover the near surface topography features, it fails to resolve the strong reflector in the subsurface. FIG. 13C shows the importance of using the reconstructed low-frequency data in the FWI process to improve the accuracy of the HR velocity model.

In exemplary embodiments, a progressive transfer learning method may be used to improve the adaptiveness of the trained ML model without overwhelming the system by tremendous amount of training data. For example, when only one training velocity model is allowed in the ML model training, the closer the training velocity model is to the true velocity model, the higher prediction accuracy the ML model may have. Thus, the progressive transfer learning method may avoid reliance on the priori information of subsurface geological or geophysical environments by converting parallel training processes to an iterative sequential training procedure with a dynamically evolving training velocity model.

In exemplary embodiments, the progressive transfer learning method may use a dynamic training velocity model and its corresponding dynamic training data for ML model training. In some embodiments, a single training velocity model may be used to reduce training cost. Compared with existing machine learning based approaches, the dynamic training data and the dynamic training velocity model are not fixed during the ML model training process. For example, the dynamic training data and the dynamic training velocity model may be evolved and continuously improved after each iteration of the ML model training to gradually absorb more subsurface information provided by the FWI process. In the progressive transfer learning method, a training process of a machine learning model may be initialized using any arbitrary training velocity model (e.g., the $S_{r,s,f}(v)$ of Eq. (1) may be arbitrarily selected). After initial training, the low-frequency data may be predicted from measured high-frequency data, and an FWI process may be performed on the predicted low-frequency data to output a velocity model. Based on the output velocity model, the training velocity model may be updated towards a direction of reducing cycle-skipping phenomenon in the output velocity model. The training data may be re-generated using the updated training velocity model, and the machine learning model may be re-trained using the updated training data.

In the progressive transfer learning method, the training velocity model and the corresponding training data may evolve in an iterative manner during the training process, and the ML model may be integrated with the FWI to alternatingly boost each other within every training iteration. By integrating information and knowledge obtained from the physics-based FWI process, the ML model may be accelerated to converge to reflect the true nonlinear relationship between the low-frequency data and the high-frequency data, and the accuracy of the prediction results may be greatly enhanced. Further, by introducing the FWI process into the training process of the ML model, the quality of the training process may be quantitatively monitored.

Figure 14:
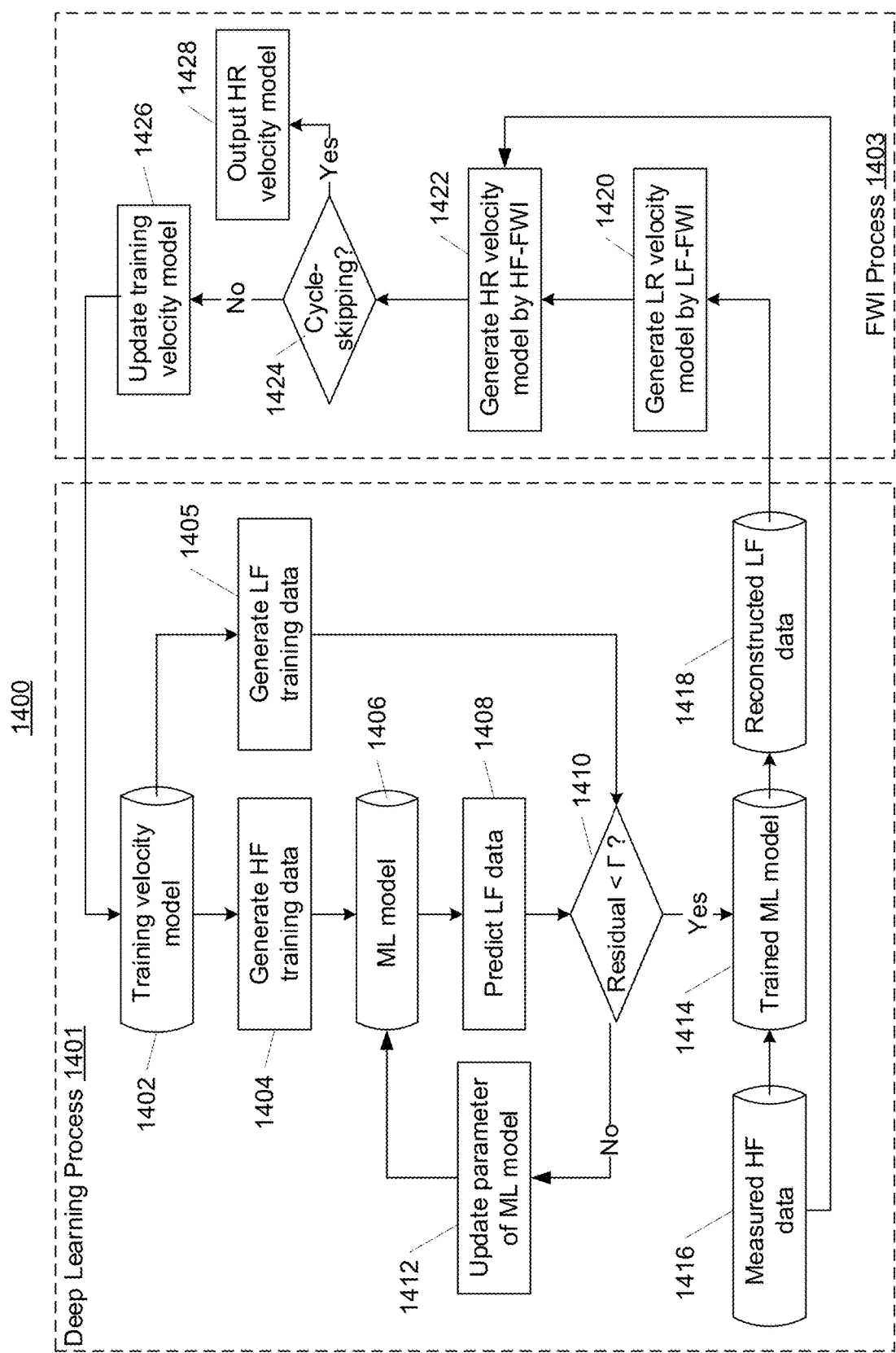
FIG. 14 is a flowchart of a progressive transfer learning method for determining a subsurface feature, according to exemplary embodiments.

FIG. 14 is a flowchart of a progressive transfer learning method 1400 for determining a subsurface feature, according to exemplary embodiments. Method 1400 may include a deep learning process 1401 for low-frequency data reconstruction and an FWI process 1403 for determining the subsurface feature based on reconstructed low-frequency data. Method 1400 may be performed by a computer system (e.g., system 100 of FIG. 1). The system may include a non-transitory storage medium (e.g., memory 130 of FIG. 1) to store program codes of method 1400. The program codes may be executed by a processor (e.g., processor 110 of FIG. 1) to implement the operations of method 1400.

Referring to FIG. 14, method 1400 may start from process 1401. At step 1402, the processor may determine an initial training velocity model (e.g., the training velocity model in FIG. 12C). For example, the processor may arbitrarily select the initial training velocity model or generate the initial training velocity model based on priori knowledge about the subsurface geological and/or geophysical environments and properties. At step 1404, the processor may generate high-frequency (HF) training data using the training velocity model. For example, the high-frequency training data may be the high-frequency training data described in association with FIGS. 12A-12C. At step 1405, the processor may generate low-frequency (LF) training data using the training velocity model. For example, the low-frequency training data may be the low-frequency training data described in association with FIGS. 12A-12C. For example, the processor may perform a seismic forward simulation on the training velocity model to generate the high-frequency training data and the low-frequency training data.

At step 1406, the processor may input the high-frequency training data to an ML model (e.g., a DNN), for predicting low-frequency data at step 1408. In some embodiments, the ML model is implemented with a dual data-feed structure (e.g., as shown in FIG. 6A), the processor may derive beat-tone training data from the high-frequency training data as described in association with FIGS. 12A-12C. The processor may input both the high-frequency training data and the beat-tone training data to the ML model for predicting low-frequency data at step 1408.

At step 1410, the processor may generate residual data based on the predicted low-frequency data and the low-frequency training data as ground truth. After generating the residual data, the processor may determine whether a value of the residual data is within a threshold $\Gamma$. The threshold $\Gamma$ may represent a preset error tolerance value. If the value of the residual data is not within the threshold $\Gamma$ (e.g., indicating that the ML model is not successfully trained), process 1401 may proceed to step 1412. Otherwise, process 1401 may proceed to step 1414.

At step 1412, the processor may update a parameter of the ML model, after which step 1406 is repeated for providing the updated ML model to predict low-frequency data again at step 1408 using the high-frequency training data. This process may be repeated until each value of the residual data is within the threshold $\Gamma$, such that the processor may output a trained ML model at step 1414.

At step 1416, the processor may input measured high-frequency data into the trained ML model output at step 1414 to reconstruct low-frequency data at step 1418. In some embodiments, the measured high-frequency data may be received through I/O device 120 of FIG. 1. For example, the measured high-frequency data may be the measured high-frequency data described in association with FIGS. 12A-12C.

In some embodiments, if the ML model is implemented with the dual data-feed structure, the processor may derive beat-tone data from the measured high-frequency data. The processor may input both the measured high-frequency data and the beat-tone data to the trained ML model to reconstruct low-frequency data at step 1418.

At step 1420, the processor may generate a low-resolution (LR) velocity model by inputting the reconstructed low-frequency data and an initial velocity model (e.g., the initial velocity model in FIG. 12B) in an LF-FWI process. The LR velocity model may retrieve a portion of the subsurface low-wavenumber structural information. At step 1422, the processor may generate a high-resolution (HR) velocity model by inputting the measured high-frequency data and the LR velocity model generated at step 1420 in an HF-FWI process.

In some embodiments, step 1420 may be performed before step 1422. In some embodiments, step 1420 and step 1422 may be simultaneously performed.

At step 1424, it is determined whether the HR velocity model may serve as an output velocity model, for example, by determining whether the HR velocity model includes cycle-skipping-induced artifacts. Typically, the training velocity model determined at step 1402 in the first iteration of process 1401 may be non-representative (e.g., due to being arbitrarily selected) of the sampling space where the true (unknown) velocity model resides. Because of the non-representative characteristics of the training velocity model, the reconstructed low-frequency data at step 1418 may be relatively inaccurate. In such cases, the HR velocity model generated at step 1422 may include cycle-skipping-induced artifacts. If the HR velocity model includes cycle-skipping-induced artifacts at step 1424, process 1403 may proceed to step 1426. Otherwise, process 1403 may proceed to step 1428.

In some embodiments, it is determined whether the HR velocity model may serve as an output velocity model, by determining whether a difference between the HR velocity model in the current iteration and the HR velocity model in the last iteration is within a preset threshold. In some embodiments, it is determined whether the HR velocity model may serve as an output velocity model, by determining whether a difference between the LR velocity model in the current iteration and the LR velocity model in the last iteration is within a preset threshold. In some embodiments, it is determined whether the HR velocity model may serve as an output velocity model, by determining whether a difference between the reconstructed low-frequency data in the current iteration and the reconstructed low-frequency data in the last iteration is within a preset threshold. The present disclosure does limit how to determine whether the HR velocity model may serve as an output velocity model at step 1424.

At step 1426, the processor may update the training velocity model based on at least one of the LR velocity model and the HR velocity model. In some embodiments, the HR velocity model determined in a current iteration of process 1403 may be used for updating the training velocity model in a next iteration of process 1401. For example, the processor may replace the training velocity model in the previous iteration with the HR velocity model obtained at step 1422, and thus the updated training velocity model contains the subsurface information extracted from the FWI process (e.g., the high-frequency FWI process at step 1422 and the low-frequency FWI process at step 1420). Also for example, parameters related to electric conductivity, porosity, or any other properties or characteristics of subsurface structures may be updated. In another example, the processor may determine an average (e.g., an arithmetic average or a weighted average) model using the HR velocity model obtained at step 1422 and the training velocity model in the previous iteration, and replace the training velocity model in the previous iteration with the average model. By updating the training velocity model, the non-representative characteristics of the training velocity model may be reduced in the next iteration of process 1401, and the reconstructed low-frequency data at step 1418 may be more accurate in the next iteration of process 1401.

In the embodiments, the relationship between the high-frequency data and low-frequency data learned by the ML model in process 1401 may be able to properly recover at least a portion of the subsurface low-wavenumber structure information. Also, the subsequent HF-FWI process at step 1422 performed on the measured high-frequency data received at step 1416 may be able to amplify the subsurface low-wavenumber structure information because high-frequency data implicitly carries such information. Although the low-wavenumber components retrieved in the first iteration of process 1401 may be dominated by strong artifacts, the HR velocity model generated at step 1422 may include richer and more representative LF-HF relationship, and thus the HR velocity model may provide information to generate a potentially better training velocity model in the next iteration of process 1401.

After updating the training velocity model at step 1426, the processor may restart process 1401. Further, based on the updated training velocity model, the processor may re-generate (e.g., by re-performing the seismic forward simulation) the high-frequency training data at step 1404 and the low-frequency training data at step 1405. Steps 1402-1426 may be repeated for multiple times. In each iteration of process 1401, the ML model at step 1406 may be improved, and the reconstructed low-frequency data at step 1418 may be enhanced. In each iteration of process 1403, the HR velocity model at step 1422 may be improved, and the training velocity model at step 1426 may be enhanced. Consequently, the ML model and the FWI process may complement each other alternatingly in an iterative manner, progressively propelling the velocity model inversion process out of local minima (e.g., $V_L$ in FIG. 3).

Still referring to FIG. 14, at step 1428, the processor may output the HR velocity model as a representation of the subsurface features, and method 1400 ends. In some embodiments, after several (e.g., three) iterations of method 1400, the predicted low-frequency data at step 1408 may converge to the low-frequency training data, and the HR velocity model at step 1422 may become free of cycle-skipping-induced artifacts. Compared with existing techniques, method 1400 may greatly accelerate the training process and accuracy of the trained ML model.

In some embodiments, method 1400 may also be quantitatively monitored to serve as a key reliability indicator of the HR velocity model output at step 1428 because the reconstructed low-frequency data at step 1418 may be expected to converge to the low-frequency training data generated at step 1405 in the last iteration of method 1400.

In the embodiments, method 1400 does not require any priori information of the subsurface geological structures or geophysical properties. Instead, the subsurface information may be gradually retrieved and integrated into the ML model. Method 1400 may be initiated by an arbitrarily selected training velocity model, which may be completely uncorrelated with the true subsurface geological structures or geophysical properties. Although the initial ML model training and the initial low-frequency data prediction may be inaccurate, during the iterations, the FWI process may provide an improved training velocity model with richer subsurface information to the ML model. Further, in subsequent iterations, the ML model may update the low-frequency prediction with continuously increasing accuracy, which may enable the FWI process to retrieve more reliable subsurface information. In method 1400, the ML model and the FWI process may be integrated seamlessly, interacting and complementing with each other to progressively push the inversion process off the local minima. Compared with a single-training-model approach, method 1400 may not need huge training velocity model library to capture the global geological information, and may avoid an overwhelming amount of training data.

Figure 15A:
FIG. 15A is a graphical representation showing a generated HR velocity model obtained by FWI using machine-learning-reconstructed low-frequency data and measured high-frequency data, according to exemplary embodiments.
Figure 15B:
FIG. 15B is a graphical representation showing a reference HR velocity model obtained by FWI using true low-frequency data and high-frequency data, according to exemplary embodiments.
Figure 15C:
FIG. 15C is a graphical representation showing a velocity model obtained by FWI using only measured high-frequency data, having cycle-skipping-induced artifacts, according to exemplary embodiments.

FIGS. 15A-15C illustrate robustness and adaptiveness of the progressive transfer learning method 1400, according to exemplary embodiments. FIG. 15A is a graphical representation showing an example velocity model generated by method 1400. For example, the velocity model may be the HR velocity model output at step 1428. The HR velocity model may be generated using measured high-frequency data (e.g., including components ranging from 10 Hz to 30 Hz) received at step 1416 and reconstructed low-frequency data (e.g., including components of 3 Hz, 5 Hz, and 7 Hz) at step 1418. FIG. 15B is a graphical representation showing an example reference HR velocity model generated by FWI based on full-bandwidth measured seismic data. For example, the full-bandwidth measured seismic data may include components ranging from 3 Hz to 30 Hz.

As shown in FIGS. 15A and 15B, given an initial velocity model and an arbitrarily selected training velocity model, the progressive transfer learning method may resolve the shallow anomalies in high precision and may successfully reconstruct the complex salt structures by accurately predicting the low-frequency data without significant computation costs (e.g., within three iterations of process 1401 and process 1403).

As a comparison, FIG. 15C is a graphical representation showing an example velocity model generated by FWI based on only the measured high-frequency data. For example, the measured high-frequency data may include components ranging from 10 Hz to 30 Hz. As shown in FIG. 15C, the velocity model includes strong cycle-skipping-induced artifacts, and the salt structural information is missing.

In the embodiments, without priori geological information, the low-frequency data reconstructed may converge to the true low-frequency data with high accuracy after limited training iterations, and the FWI process may output subsurface velocity models free of cycle-skipping-induced artifacts. Accordingly, method 1400 may be applied in large scale seismic data analysis with substantially reduced efficiency and convergence issues.

The embodiments described above use the FWI as an example of the velocity model building method. One of ordinary skill in the art will understand that the present disclosure is not limited to the FWI, and can apply to other velocity model building methods.

In exemplary embodiments, there is also provided a non-transitory computer-readable medium having stored therein instructions. For example, the instructions may be executed by a processor of a system to cause the system to perform the above described methods. For example, the non-transitory computer-readable medium may be a floppy disk, a flexible disk, hard disk, solid-state drive, magnetic tape, or any other magnetic data storage medium, a Compact Disc Read-Only Memory (CD-ROM), any other optical data storage medium, any physical medium with patterns of holes, a Random Access Memory (RAM), a Programmable Read-Only Memory (PROM), and Erasable Programmable Read-Only Memory (EPROM), a FLASH-EPROM or any other flash memory, Non-Volatile Random Access Memory (NVRAM), a cache, a register, any other memory chip or cartridge, and networked versions of the same.

While illustrative embodiments have been described herein, the scope thereof includes any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented method for obtaining reconstructed seismic data for determining a subsurface feature, the method comprising:
   determining an initial training velocity model;
   training a machine learning model based on first training seismic data and second training seismic data generated from the training velocity model, the first training seismic data corresponding to one or more first frequencies, the second training seismic data corresponding to one or more second frequencies, the one or more second frequencies being lower than the one or more first frequencies;
   obtaining, based on measured seismic data and the machine learning model, reconstructed seismic data corresponding to the one or more second frequencies;
   generating a velocity model based on the measured seismic data, the reconstructed seismic data, and a full waveform inversion (FWI); and
   when the generated velocity model does not satisfy a preset condition, updating the training velocity model based on the generated velocity model, to obtain updated reconstructed seismic data for determining a subsurface feature.

2. The computer-implemented method of claim 1, wherein determining the initial training velocity model comprises one of:
   randomly selecting an arbitrary velocity model as the initial training velocity model; or
   generating the initial training velocity model based on a priori knowledge of the subsurface feature.

3. The computer-implemented method of claim 1, further comprising:
   performing a seismic forward simulation on the training velocity model to generate the first training seismic data and the second training seismic data.

4. The computer-implemented method of claim 3, wherein performing the seismic forward simulation comprises:
   performing the seismic forward modeling using at least one of a finite-difference time-domain (FDTD) method, a finite element method (FEM), a boundary element method, an integral equation method, a spectral element method, a pseudo spectral method, a fast multipole method, a method of lines, a finite volume method, a meshfree method, or a discontinuous Galerkin method.

5. The computer-implemented method of claim 1, wherein training the machine learning model comprises:
   determining predicted seismic data by inputting the first training seismic data to the machine learning model, the predicted seismic data corresponding to the one or more second frequencies;
   determining whether a difference between the predicted seismic data and the second training seismic data exceeds a threshold; and
   if the difference exceeds the threshold, updating a parameter of the machine learning model.

6. The computer-implemented method of claim 5, wherein obtaining the reconstructed seismic data corresponding to the one or more second frequencies comprises:
   if the difference does not exceed the threshold, determining the reconstructed seismic data by inputting the measured seismic data to the machine learning model.

7. The computer-implemented method of claim 1, wherein training the machine learning model comprises:
  determining beat tone training data from the first training seismic data;
  determining predicted seismic data by inputting the first training seismic data and the beat tone training data to the machine learning model, the predicted seismic data corresponding to the one or more second frequencies;
  determining whether a difference between the predicted seismic data and the second training seismic data exceeds a threshold; and
  if the difference exceeds the threshold, updating a parameter of the machine learning model.

8. The computer-implemented method of claim 1, wherein the machine learning model is implemented as at least one of a deep neural network (DNN), a convolutional neural network, a fully connected neural network, a random forest model, a support vector machine model, or a gradient boosting model.

9. The computer-implemented method of claim 1, wherein generating the velocity model comprises:
  determining an initial FWI velocity model for the FWI; and
  performing one of:
    generating a low-resolution velocity model by using the reconstructed seismic data and the initial FWI velocity model as inputs to the FWI; and generating a high-resolution velocity model by using the measured seismic data and the low-resolution velocity model as inputs to the FWI; or
    generating the high-resolution velocity model by using the measured seismic data, the reconstructed seismic data, and the initial FWI velocity model as inputs to the FWI, without generating the low-resolution velocity model.

10. The computer-implemented method of claim 9, further comprising:
  if the high-resolution velocity model satisfies the preset condition, determining the high-resolution velocity model as a representation of the subsurface feature; and
  if the high-resolution velocity model does not satisfy the preset condition, updating the training velocity model based on at least one of the low-resolution velocity model or the high-resolution velocity model.

11. The computer-implemented method of claim 10, further comprising:
  in response to the training velocity model being updated, updating the first training seismic data and the second train seismic data, to further train the machine learning model.

12. A system, comprising:
  a processor; and
  a memory storing instructions executable by the processor,
  wherein the processor is configured to:
  determine an initial training velocity model;
  train a machine learning model based on first training seismic data and second training seismic data generated from the training velocity model, the first training seismic data corresponding to one or more first frequencies, the second training seismic data corresponding to one or more second frequencies, the one or more second frequencies being lower than the one or more first frequencies;
  obtain, based on measured seismic data and the machine learning model, reconstructed seismic data corresponding to the one or more second frequencies;
  generate a velocity model based on the measured seismic data, the reconstructed seismic data, and a full waveform inversion (FWI); and
  when the generated velocity model does not satisfy a preset condition, update the training velocity model based on the generated velocity model, to obtain updated reconstructed seismic data for determining a subsurface feature.

13. The system of claim 12, wherein in determining the initial training velocity model, the processor is further configured to perform one:
  randomly selecting an arbitrary velocity model as the initial training velocity model; or
  generating the initial training velocity model based on a priori knowledge of the subsurface feature.

14. The system of claim 12, wherein the processor is further configured to:
  perform a seismic forward simulation on the training velocity model to generate the first training seismic data and the second training seismic data.

15. The system of claim 12, wherein in training the machine learning model, the processor is further configured to:
  determine predicted seismic data by inputting the first training seismic data to the machine learning model, the predicted seismic data corresponding to the one or more second frequencies;
  determine whether a difference between the predicted seismic data and the second training seismic data exceeds a threshold; and
  if the difference exceeds the threshold, updating a parameter of the machine learning model.

16. The system of claim 15, wherein in obtaining the reconstructed seismic data corresponding to the one or more second frequencies, the processor is further configured to:
  if the difference does not exceed the threshold, determine the reconstructed seismic data by inputting the measured seismic data to the machine learning model.

17. The system of claim 12, wherein in training the machine learning model, the processor is further configured to:
  determine beat tone training data from the first training seismic data;
  determine predicted seismic data by inputting the first training seismic data and the beat tone training data to the machine learning model, the predicted seismic data corresponding to the one or more second frequencies;
  determine whether a difference between the predicted seismic data and the second training seismic data exceeds a threshold; and
  if the difference exceeds the threshold, update a parameter of the machine learning model.

18. The system of claim 12, wherein in determining the subsurface feature based on the FWI, the processor is further configured to:
  determine an initial FWI velocity model for the FWI; and
  perform one of:
    generating a low-resolution velocity model by using the reconstructed seismic data and the initial FWI velocity model as inputs to the FWI; and generating a high-resolution velocity model by using the measured seismic data and the low-resolution velocity model as inputs to the FWI; or
    generating the high-resolution velocity model by using the measured seismic data, the reconstructed seismic data, and the initial FWI velocity model as inputs to the FWI, without generating the low-resolution velocity model.

19. The system of claim 18, wherein the processor is further configured to:
if the high-resolution velocity model satisfies the preset condition, determine the high-resolution velocity model as a representation of the subsurface feature; and
if the high-resolution velocity model does not satisfy the preset condition, update the training velocity model based on at least one of the low-resolution velocity model or the high-resolution velocity model.

20. A non-transitory computer-readable storage medium having stored therein instructions that, when executed by a processor of a device, cause the device to perform operations comprising:
determining an initial training velocity model;
training a machine learning model based on first training seismic data and second training seismic data generated from the training velocity model, the first training seismic data corresponding to one or more first frequencies, the second training seismic data corresponding to one or more second frequencies, the one or more second frequencies being lower than the one or more first frequencies;
obtaining, based on measured seismic data and the machine learning model, reconstructed seismic data corresponding to the one or more second frequencies;
generating a velocity model based on the measured seismic data, the reconstructed seismic data, and a full waveform inversion (FWI); and
when the generated velocity model does not satisfy a preset condition, updating the training velocity model based on the generated velocity model, to obtain updated reconstructed seismic data for determining a subsurface feature.

* * * * *

UNITED STATES PATENT AND TRADEMARK OFFICE
CERTIFICATE OF CORRECTION

PATENT NO. : 11,409,011 B2
APPLICATION NO. : 16/923525
DATED : August 9, 2022
INVENTOR(S) : Wenyi Hu Page 1 of 1

It is certified that error appears in the above-identified patent and that said Letters Patent is hereby corrected as shown below:

In the Specification

Column 11, Line 50, "the second train seismic data" should read -- the second training seismic data --.

In the Claims

Claim 11, Column 21, Lines 48-49, "the second train seismic data" should read -- the second training seismic data --.

Claim 12, Column 21, Line 55, "wherein the processor is configured to;" should read -- wherein the processor is configured to: --.

Signed and Sealed this
Twenty-fifth Day of October, 2022

Katherine Kelly Vidal
*Director of the United States Patent and Trademark Office*